Feb. 23, 1971  E. F. STELL  3,564,813
FLOWABLE MATERIAL CONTROL SYSTEM
Filed April 29, 1968  6 Sheets-Sheet 1
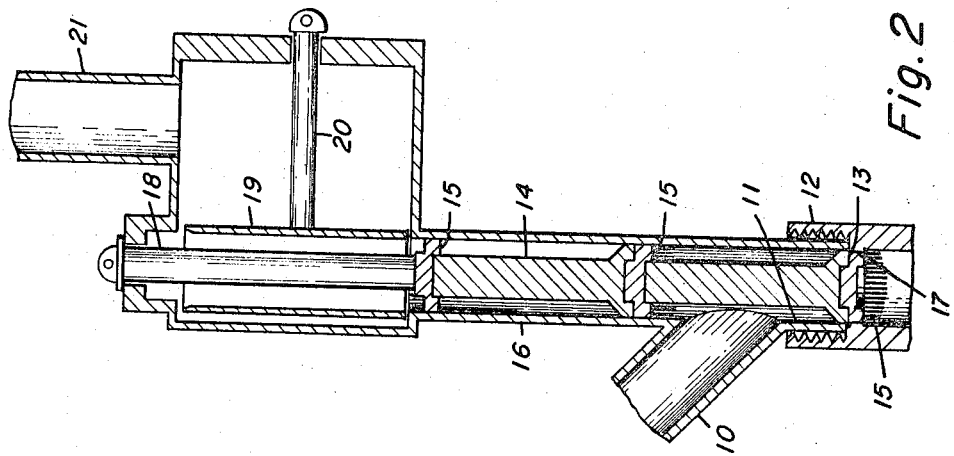
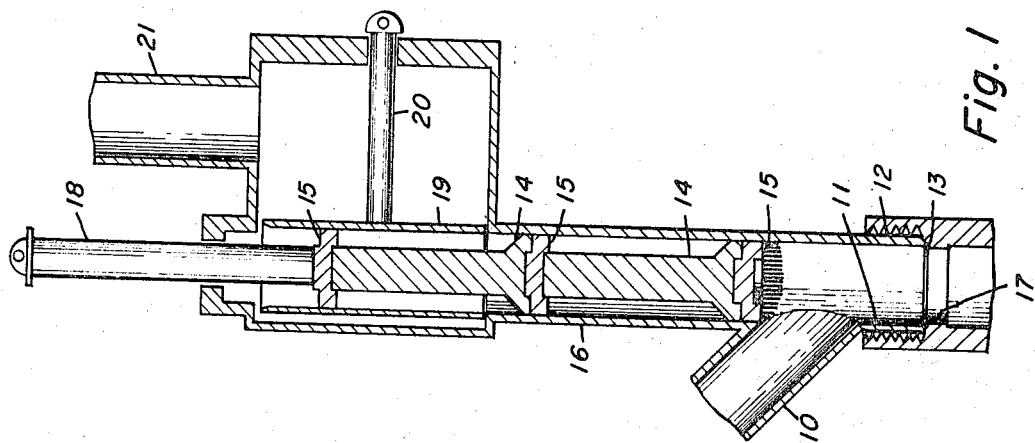
INVENTOR:
EDWARD F. STELL
BY: *John R. Duncan*
ATTORNEY

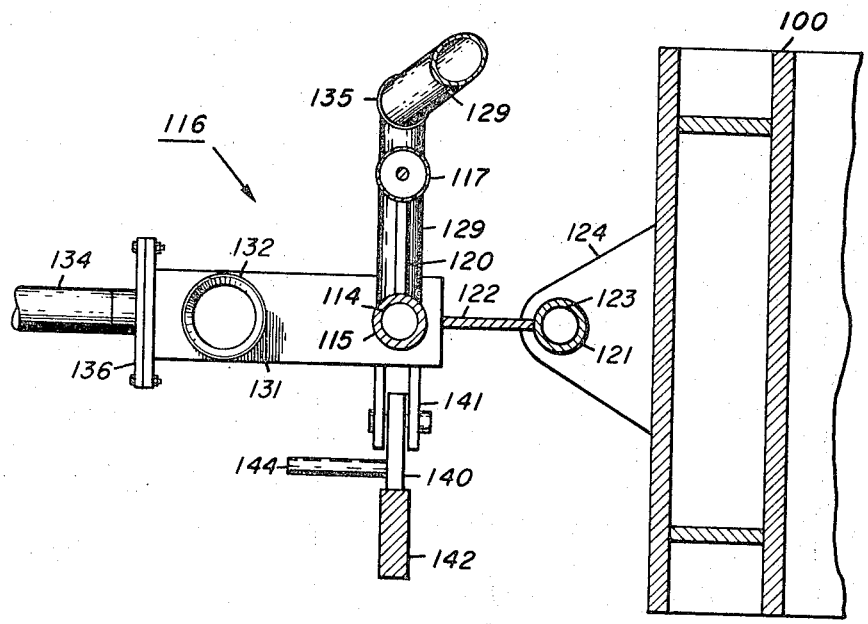
Fig. 9
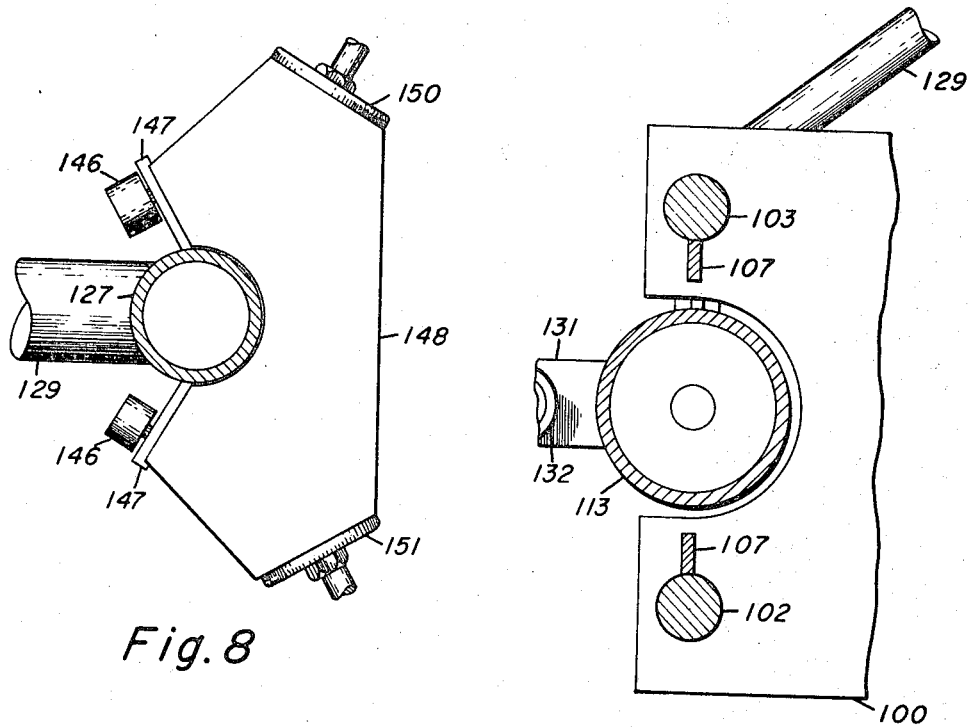
Fig. 8
Fig. 10

United States Patent Office 3,564,813
Patented Feb. 23, 1971

3,564,813
FLOWABLE MATERIAL CONTROL SYSTEM
Edward F. Stell, Saratoga, Calif., assignor to General
Electric Company, a corporation of New York
Filed Apr. 29, 1968, Ser. No. 725,096
Int. Cl. B65b 1/06, 57/00, 31/00
U.S. Cl. 53—37                                        10 Claims

ABSTRACT OF THE DISCLOSURE

A system for controlling flowable material is disclosed which uses a two-piece sealing member to simultaneously seal a filling means outlet and a container inlet. This system is especially advantageous in filling containers with toxic materials such as radioactive waste materials, since at no time is a contaminated surface exposed to the environment.

BACKGROUND OF THE INVENTION

Nuclear chain fission reactions and the reactors in which they take place are now well known. A typical nuclear reactor includes a chain reacting assembly or core made up of nuclear fuel material contained in fuel elements. The fuel material is generally encased in a corrosion resistant heat conductive shell or cladding. The reactor core, made up of a plurality of these elements in spaced relationship, is enclosed in a container through which the reactor coolant flows. As the coolant passes between the spaced fuel elements, it is heated by thermal energy released during the fission reaction. The heated coolant then leaves the reactor, the heat energy is used to perform useful work such as by driving a turbine and the now-cooled coolant is recycled back to the reactor.

The nuclear fuel material contains fissionable atoms, such as U-233, U-235, Pu-239 and Pu-241. The fuel may be in elemental or compound form. When the nucleus of such an atom absorbs a neutron, a nuclear fission frequently occurs. This produces on the average two fission product atoms of lower atomic weight, several high energy neutrons and a large amount of kinetic energy. The kinetic energy of the fission products and fission neutrons is quickly dissipated, producing heat. So long as at least one neutron from each fission event induces a subsequent fission event, the fission reaction is self-sustaining. The fissionable atoms are thus gradually consumed. Some of the fission products produced are strong neutron absorbers (neutron poisons) which absorb neutrons which would otherwise contribute to the chain reaction. The fission reaction, therefore, tends to decrease and cannot be maintained indefinitely on a given level. Ultimately, the operating power level of the reactor decreases to the point at which the reactor must be shut down for refueling. At least a suitable fraction of the irradiated fuel assemblies are removed and replaced with new fuel having the desired concentration of the fissionable atoms and no fission product neutron poisons.

The irradiated reactor fuel removed from the reactor contains valuable quantities of the fissionable material, fertile material and certain transuranic isotopes, in addition to quantities of highly radioactive fission products. It is highly desirable that the irradiated fuel material be reprocessed to recover and separate the valuable materials from the waste materials. Typical irradiated fuel recovery processes include those described in U.S. Pats. 3,222,124 and 3,359,078. A substantial quantity of highly radioactive waste material, comprising fission products from the fuel, process chemicals, etc., results from such a process. This material must be placed in suitable containers and stored. This material is generally in liquid or granular form. Merely piping this material to conventional containers, which are sealed after being filled is not satisfactory. Radioactive gases, powder particles or vapors may be emitted by the open container and/or open fill pipe, contaminating the surrounding area. Even if remotely operated manipulators are used to perform the filling operation, the manipulators and filling room will become contaminated, making repair and servicing of the equipment difficult. While valves may be used in the fill pipes and in the container neck, the exposed surface of the closed valve and that portion of the fill pipe and container between the opening and the valve still may have surface contamination. With some toxic chemicals and some radioactive isotopes, even microscopic amounts are dangerous to personel in the vicinity. Such equipment is also expensive and complex. Ideally, the system should permit direct operator control when radiation levels permit.

While the problems of controlling the spread of highly radioactive waste material are especially severe, similar problems exist in handling other toxic materials. For example, many pesticides and other toxic chemicals must be handled in a manner which prevents contact between the operating personnel and the material. Present contamination control techniques are slow and complex, unsuited to the rapid handling of large quantities of material.

Thus, there is a continuing need for improved systems for handling toxic material.

SUMMARY OF THE INVENTION

It is, therefore, an object of this invention to provide a flowable material control system overcoming the above-noted problems.

Another object of this invention is to provide a flowable material handling system which seals both the material container and the container fill pipe.

Another object of this invention is to provide a simple and inexpensive toxic material handling system.

The above objects, and others, are accomplished in accordance with this invention by providing a flowable material control and sealing system which uses a unique two-part seal assembly to simultaneously remotely seal a material container inlet and the fill pipe outlet at the completion of the filling operation. The seal in the fill pipe outlet is remotely released only after the fill pipe is in sealing contact with the next container to be filled. Thus, the fill pipe and filled container are at all times sealed to prevent the emission of toxic material therefrom. At no time is a contaminated surface exposed to the environment in the toxic material handling area. This system is simple, convenient, capable of rapidly handling large quantities of toxic material, and may be directly operated by personnel in the handling area, if radiation levels permit. This system is also useful in filling containers with food or other chemical materials which could be contaminated by exposure to the environment.

BRIEF DESCRIPTION OF THE DRAWINGS

Details of the invention will be further understood upon reference to the drawings, in which:

FIG. 1 shows, schematically, a vertical section through the two-way sealing system of this invention in the filling condition;

FIG. 2 shows the system of FIG. 1 in the sealing condition;

FIG. 8 shows a horizontal section taken on line 8—8 in FIG. 5;

FIG. 9 shows a horizontal section taken on line 9—9 in FIG. 6; and

FIG. 10 shows a horizontal section taken on line 10—10 in FIG. 6.

Referring now to FIG. 1, there is seen a process feed material handling system including means which receives liquid, granular, powdered, etc., feed material through supply pipe 10 and directs the material through nozzle 11 to container 12. FIG. 1 shows the system as arranged during the filling operation. A valve (not shown) in supply line 10 is opened, allowing material to flow by gravity or be pumped from upstream process equipment or storage. The process feed material flows into container 12 until the desired quantity has accumulated. Flow may be metered by any conventional techniques, such as by flow meters in line 10 or by weighing container 12 during filling. Desirably, a gasket 13 is positioned between the end of nozzle 11 and container 12 to prevent escape of feed material therebetween. While container 12 and nozzle 11 may have any desired internal cross-section, such as rectangular or elliptical, for simplicity it is preferred that they have a substantially circular cross-section.

Figure 4:
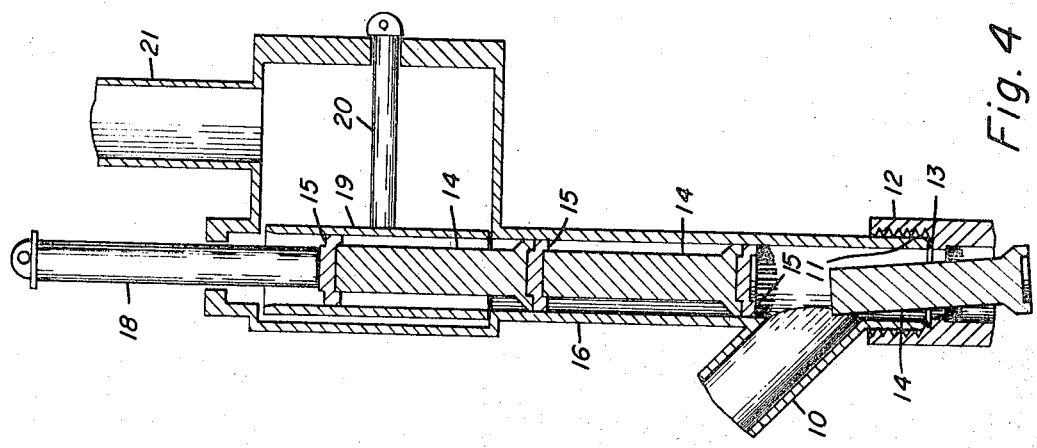
FIG. 4 shows the system of FIG. 1 in the unsealing condition.

A plurality of two-part seals, each consisting of a plug 14 and cap 15, are stacked in a magazine 16 above nozzle 11. Plugs 14 and caps 15 tightly bear against the walls of magazine 16, preventing leakage of feed material upward into magazine 16. Magazine 16, nozzle 11 and container neck 17 have substantially the same internal diameter. Feed rod 18 is positioned above the stack of two part seals, adopted to push them downwardly from magazine 16 into nozzle 11. Feed rod 18 may be operated manually or by means of conventional air or hydraulic cylinder drives.

A loading sleeve 19, movable by loading rod 20, is arranged to receive two-piece seal assemblies through loading part 21. As is further pointed out below, loading sleeve is positioned below loading part 21, a two-part seal consisting of a plug 14 and cap 15 is dropped through loading part 21 into loading sleeve 19. Loading rod 20 is extended to move loading sleeve 19 into alignment with feed rod 18.

After container 12 is filled to the desired level with process feed material, flow through supply pipe 10 is stopped. Feed rod 18 is then extended to bring the system into the arrangement shown in FIG. 2.

As seen in FIG. 2, the stack of two-part seals in magazine 16 has been pushed downwardly so that the lowest cap 15 is tightly positioned in the neck 17 of container 12. To insure that feed material, or gas or vapor evolved therefrom, cannot leak past cap 15, it may be desirable to taper the walls of container neck 17 slightly inwardly as to arrange a circumferential inwardly extending ridge around container neck 17 to insure positive sealing between neck 17 and cap 15.

Figure 3:
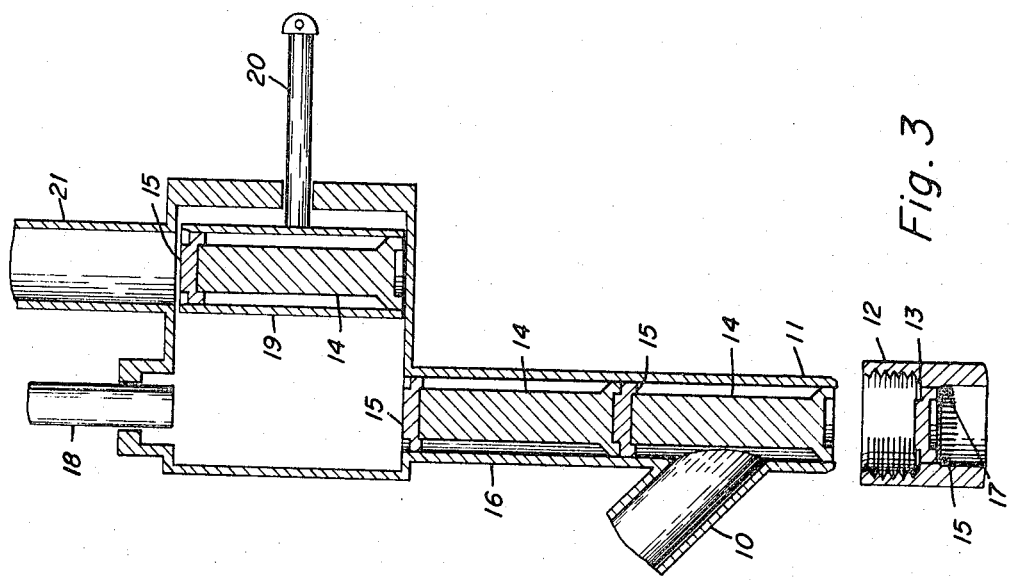
FIG. 3 shows the system of FIG. 1 in the container handling condition.

When container 12 is separated from nozzle 11, as shown in FIG. 3, the lowest cap 15 separates from the lowest plug 14. Cap 15 in neck 17 seals container 12 while plug 14 seals nozzle 11. Thus, no surfaces contaminated with process feed material are exposed to the environment.

FIG. 3 also shows loading sleeve 19 positioned to receive a new two-way seal assembly from loading part 21. Loading rod 20 then pushes loading sleeve 19 to the left to align the new seal with feed rod 18.

As seen in FIG. 4, after an empty container 12 is brought into contact with nozzle 11, feed rod 18 is moved downwardly, pushing the stack of two-way seal assemblies in sleeve 19, magazine 16 and nozzle 11 downwardly. Once the widest portion of lowest plug 14 passes neck 17, the plug falls into container 12. This is desirable, since the upper portion of this plug may be contaminated with process feed material. The system is then again in the arrangement shown in FIG. 1, and filling of the second empty container can begin.

As can be seen, the system retains all process feed material within the containers, nozzle 11 and feed pipe 10. Thus, operating personnel may work in the vicinity without contacting the process feed material.

FIGS. 5–10 show details of an especially preferred embodiment of the system schematically illustrated in FIGS. 1–4. The preferred embodiment includes various preferred arrangements and specific means which permit the system to be operated in an optimum manner.

Figure 5:
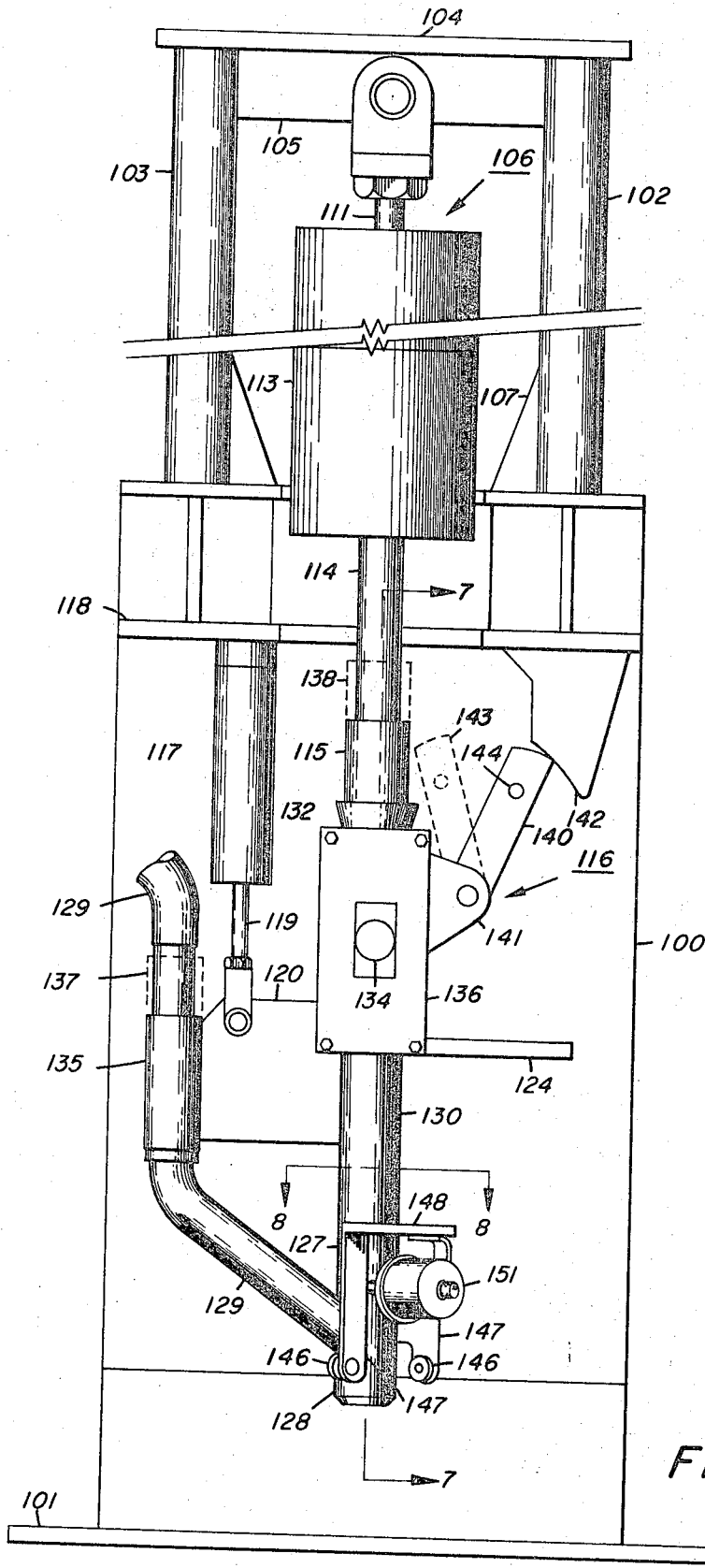
FIG. 5 shows a front elevation of a preferred embodiment of a two-way sealing system according to the present invention.
Figure 6:
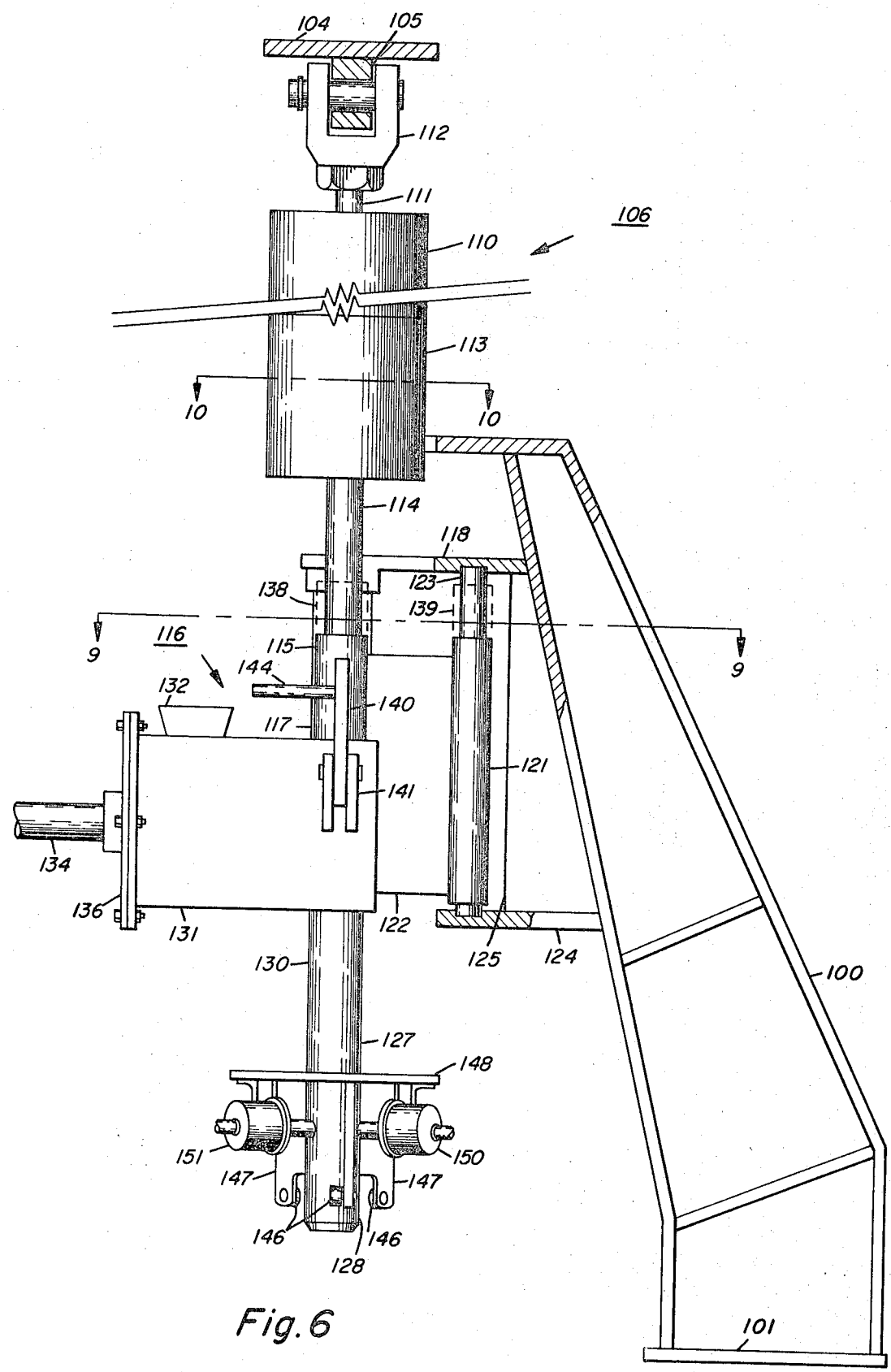
FIG. 6 shows a side elevation of the system shown in FIG. 5.

FIGS. 5 and 6 show front and side elevations of the preferred embodiment. The systems shown in FIGS. 5 and 6 will best be understood by referring to FIGS. 8, 9 and 10, which show horizontal sections through FIGS. 5 and 6, when appropriate. The system is supported in cantilever fashion by a support member 100 secured to a baseplate 101 which may be removably fastened to the floor of the container filling room.

A pair of upstanding columns 102 and 103, mounted on support member 100, with the aid of braces 107, are connected together at the top by plates 104 and 105 from which main air cylinder assembly 106 depends. Columns 102 and 103 and air cylinder assembly 106 have been shortened and portions of the supporting means have been cut away for clarity. The arrangement of the air cylinder columns 102 and 103 is further clarified in FIG. 10, which shows a horizontal section through FIG. 6 taken on line 10—10.

Figure 7:
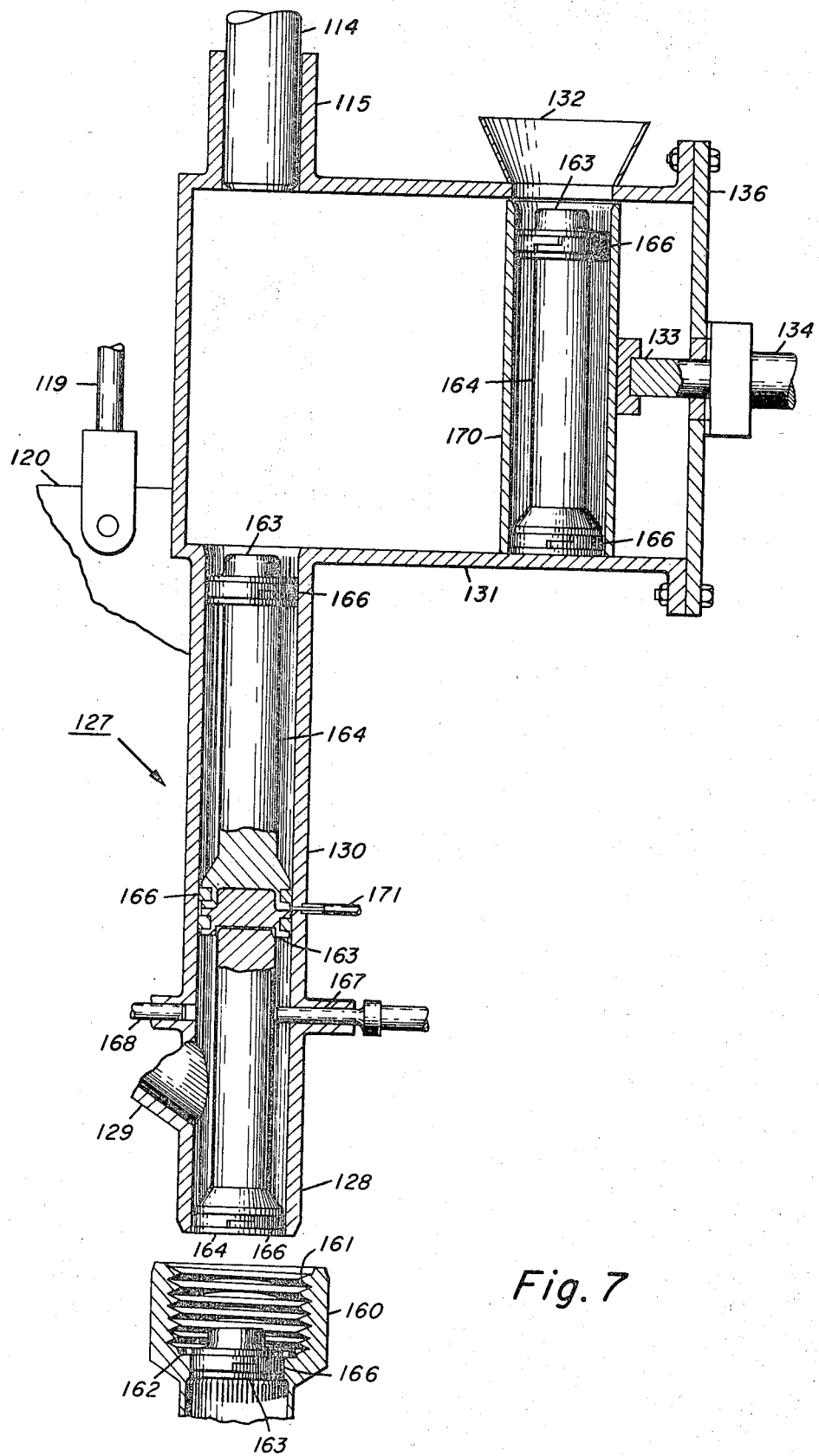
FIG. 7 shows a vertical section taken approximately on line 7—7 in FIG. 5.

Main air cylinder assembly 106 consists of two air or hydraulic drive cylinders secured together in a back-to-back arrangement. Upper cylinder 110 extends and retracts rod 111 which is connected to plate 105 through hanger assembly 112. Lower cylinder 113 extends and retracts rod 114 within sleeve 115 to feed the two-part seal assemblies downwardly (as seen in FIG. 7). As is further described below, this double cylinder system permits movement of the two-part seal assemblies whether the filling assembly 116 is in the upper or lower position.

Filling assembly 116 is raised and lowered by lift air cylinder 117 which is secured to upper support plate 118 and which extends and retracts rod 119 connected to plate 120 mounted on filling assembly 116. In operation, rod 119 is retracted, a container is positioned under the fill nozzle and rod 119 extends to insert the nozzle into the container. Filling assembly 116 is guided during this vertical movement by sleeve 121 which is secured to filling assembly 116 by web 122 and which surrounds guide rod 123. Guide rod 123 is fixed to support member 100 by upper support plate 118 and lower support plate 124. Plates 118 and 124 are reinforced by brace 125.

The horizontal arrangement of filling assembly 116 is best seen in FIG. 9, which shows a section through FIG. 6 taken on line 9—9.

Filling assembly 116 includes a tube 127 at the lower end of which is nozzle 128. Supply pipe 129 is connected to tube 127 just above nozzle 128. Within tube 127, above this connection is located a magazine 130 adapted to contain a stack of two-way seals. Tube 127 opens into a seal loading box 131 above magazine section 130. Seal loading box 131 includes a loading part 132 through which seals are inserted. An air cylinder 134 mounted on removable cover 136 to drive an extendible rod which moves a loading sleeve between alignment with loading part 132 and magazine section 127 of tube 130, as shown in detail in FIG. 7.

FIGS. 5 and 6 show filling assembly 116 in the lowered, container-engaging position. The positions of sleeve 115 and sleeve 121 when filling assembly 116 is in the raised position are indicated by broken lines at 138 and 139, respectively. A telescoping sleeve arrangement 135 is provided in supply pipe 129 to provide for vertical movement of filling assembly 116. The position of sleeve 135 when filling assembly 116 is raised is shown by broken lines at 137.

It is important that nozzle 128 not be raised during the flow of process feed material through supply pipe 129 and nozzle 128. A lock lever 140, pivotably mounted at 141 on seal loading box 131, engages a surface 142 to prevent inadvertent movement of nozzle 128 during filling. After the container is filled and the two seals are in place, lock lever 140 is moved to the position shown in broken lines at 143 by means of handle 144. Of course, the locking and unlocking may be performed automatically, such as by a solenoid controlled by means sensing seal location, as is described further below.

Desirably, guide means are provided to guide nozzle 128 into the neck of a container to be filled as filling assembly 116 is lowered over the container. Three evenly spaced rollers 146 are provided around nozzle 128, each supported by a bracket 147 attached to support plate 148. These rollers engage the outside of the container neck and correct for slight misalignment between the container and nozzle 128.

A pair of small air cylinders 150 and 151 which drive rods which extend through the wall of tube 127 above nozzle 128 are also supported by brackets mounted on support plate 148. The arrangement of rollers 146 and air cylinders 150 and 151 are further detailed in FIG. 8.

FIG. 7 shows a partial section through filling assembly 116 taken substantially along line 7—7 in FIG. 5. For clarity, supply pipe 129, the rods driven by air cylinders 150 and 151 and support plate 120 are shown rotated from their actual positions into transverse positions. Filling assembly 116 is shown in the raised position, after container 160 has been filled and container 160 and nozzle 128 have been sealed. Threads 161 are provided on container 160 so that a permanent cap may be threaded thereinto. Gasket material 162 is also provided to seal the container-nozzle interface during filling.

Magazine section 130 holds a stack of two-way seals, each consisting of a cap 163 and a plug 164. While the caps and plugs may be made of any suitable material, which is inert to the process materials, stainless steel is preferred. Expanding seal rings 166, in the nature of conventional piston rings, are provided on each cap and plug to insure uniform sealing contact against the walls. The rings 166 preferably comprise stainless steel where radioactive materials are involved, although standard elastomeric O-rings would be preferred for normal food and chemical service. Rods 167 and 168, extended and retracted by air cylinders 150 and 151, respectively, penetrate tube 127 and, in the extended position, contact the plug 164. These rods prevent movement of the plugs when in contact therewith, as discussed further below.

Sleeve 170, located within seal loading box, is moved by air cylinder 134 to shift seal assemblies from alignment with loading part 132 to alignment with feed rod 114.

An air inlet orifice 171 is provided through which air may be admitted. If this air does not leak away, it indicates that seals are in the proper sealing position.

Thus, this material handling system is seen to be mechanically simple and capable of manual or automatic operation with high reliability.

OPERATION OF A PREFERRED EMBODIMENT

The operation of the preferred embodiment is straightforward. This embodiment is operated substantially in the manner schematically illustrated in FIGS. 1–4.

Initially, air cylinder 117 retracts rod 119 to raise filling assembly 116 to the upper position. Air cylinder 110 retracts rod 111 to compensate for the position of filling assembly 116 and air cylinder 113 retracts rod 114 to the positions shown in FIG. 7.

A two-part seal assembly, consisting of plug 164 and cap 163 is inserted into sleeve 170 through loading part 132. Air cylinder 134 extends rod 133 to move sleeve 170 into vertical alignment with rod 114. Rod 114 is extended, pushing the seal assembly into magazine section 130 of tube 127. A second seal assembly is loaded in the same manner and pushed into magazine section 130 by rod 114. The first seal now spans the connection between supply pipe 129 and tube 127, effectively sealing the supply pipe from nozzle 128. Expanding rings 166 on the cap and plug lightly press against the walls of tube 127 to provide an effective seal. A third seal assembly is loaded and positioned above the first two stacked seals. Rod 167 is extended by air cylinder 151 to press against the side of plug 164, as seen in FIG. 7, to positively hold plug 164 in position. The filling assembly is now loaded and ready for operation.

A container 160 is positioned below nozzle 128 and rod 119 is extended to lower nozzle 128 into the neck of container 160. A gasket 162 is compressed between nozzle 128 and a narrowed portion of the neck of container 160 to prevent leakage of process feed material during filling. Rod 111 is extended the same distance as rod 119 to maintain the lower end of rod 114 in the same position relative to the stack of seals in magazine 130. Rod 167 is retracted out of tube 127 to free lowest plug 164 for movement. Rod 114 is extended slightly to move expanding ring 166 portion on the lowest plug 164 past the narrow neck portion of container 160. Plug 164 then drops by gravity into container 160, leaving lowest cap 163 positioned in tube 127 just above the supply pipe opening. The caps loosely mate with the plugs, and do not restrain plug movement. If liquid is being handled, the cap and plug should mate more tightly to prevent entrance of liquid between them. If desired, small elastomeric O-rings may be interposed between cap and plug to prevent the entrance of liquid therebetween. The lowest cap will here serve as a seal to prevent process feed material passing upwardly through tube 127 during the filling operation. Lowest cap 163 is subjected to gravitational and vibrational forces which might tend to undesirably move it downward during the filling operation. Therefore, rod 168 is extended by air cylinder 150 into tube 127 just below lowest cap 163 to act as a stop to prevent such movement. Lock lever 140 is moved into engagement with surface 142 to prevent accidental raising of nozzle 128 during the container filling operation.

Flow of process feed material through supply pipe 129 and nozzle 128 is now begun. After the desired amount of material has been delivered, flow is stopped. Rod 168 is retracted out of tube 127. Rod 114 is extended to push the stack of seal assemblies downwardly until the lowest cap 163 is press-fit into the narrow portion of the neck of container 160. Nozzle 128 is now sealed by the next plug 164. Air is admitted through orifice 171 to ascertain the presence of the seal. If the air pressure remains steady, the seals are in the proper position, while if air leaks away, the seals are shown to be above or below the proper position.

Rod 167 is extended by air cylinder 151 to press against the side of plug 164. This positively holds plug 164 in position and is a final indication of the presence of the plug in position. Lock lever 140 is moved out of engagement with surface 142, thus forcing filling assembly 116 for upward movement. Rods 119 and 111 are now each retracted an equal distance to raise filling assembly 116 above container 160 while maintaining the position of rod 114 relative to filling assembly 116. Rod 114 is then retracted to clear sleeve 170. Rod 133 retracts to return sleeve 170 to the loading position. Another seal assembly is placed in sleeve 170 and rod 133 extends to return the loaded sleeve into vertical alignment with rod 114. The filled container is replaced with an empty one and the above cycle is repeated.

This system is capable of rapid operation with reliable leakage prevention at all times. While this system may be operated manually, it is capable of automatic operation by the incorporation of conventional sensors, switches and servo-mechanisms.

Although specific components and operative sequences have been described in the above description of a preferred embodiment, other suitable materials, components or sequences of operations may be used, where suitable, with similar results.

While the above-described system has great utility in the handling of toxic materials such as radioactive waste materials, it has utility in any system wherein sealing of filled containers and filling nozzles is desirable. For example, where flammable or explosive gases or vapors are present, or where contamination of the process feed material by the surrounding atmosphere as in food processing or in the handling of easily oxidized materials, immediate sealing of the container and nozzle would be highly desirable.

Other modifications and ramifications of the present invention will occur to those skilled in the art upon reading the present disclosure. These are intended to be included within the scope of this invention.

I claim:
1. A flowable material control system comprising:
   (a) a nozzle through which flowable material is delivered to a container;
   (b) supply means directing flowable material to said nozzle;
   (c) means to bring said nozzle into sealing engagement with a container inlet;
   (d) at least one seal assembly comprising first and second sealing elements;
   (e) seal feed means to bring said seal assembly into contact with said nozzle and container while they are still in sealing engagement; and
   (f) means to separate said nozzle from said container inlet and the two seal elements from each other, whereby said first element seals the nozzle outlet and said second element seals the container inlet.

2. The system of claim 1 wherein each of said seal assemblies consists of:
   (a) an elongated plug having a relatively narrow body and an expanded portion at a first end of said plug, said first end portion adapted to tightly fit in and seal said nozzle; and
   (b) a cap adapted to be loosely carried by the second end of said plug, said cap adapted to tightly fit in and seal said container inlet.

3. The system of claim 1 further including a magazine capable of holding a plurality of said seal assemblies, and means to replenish said magazine as said seal feed means brings seal assemblies from said magazine into sealing engagement with said nozzle outlet and container inlet.

4. The system of claim 1 further including guide means to guide said nozzle into sealing engagement with said container inlet.

5. The system of claim 1 further including locking means to lock said nozzle in sealing engagement with said container inlet while said supply means is directing flowable material through said nozzle into said container.

6. A flowable material control system comprising:
   (a) an elongated tube having a nozzle at one end;
   (b) a flowable material supply means penetrating said tube adjacent said nozzle; a magazine section in said tube adapted to hold a plurality of seal assemblies;
   (c) means to drive said seal assemblies from said magazine through said nozzle; and
   (d) means to supply additional seal assemblies to said magazine section.

7. A seal assembly comprising:
   (a) an elongated plug having a body portion and an expanded substantially cylindrical first end portion;
   (b) a cap member loosely mounted on the second end of said plug, said cap having a substantially cylindrical surface substantially co-axial with said first end portion;
   (c) each of said first end portions and said cap having a circumferential groove with a compressible ring-shaped member partially recessed therein; and
   (d) said first end portion having an axial recess adapted to loosely receive an axial projection on the cap member of another similar seal assembly.

8. A flowable material control method comprising the steps of:
   (a) bringing a material feed nozzle outlet into sealing engagement with the inlet of a container;
   (b) flowing material from a supply source into said container through said nozzle;
   (c) stopping said flow after the desired quantity has entered said container;
   (d) bringing a two-part seal assembly into sealing engagement with said nozzle outlet and said container inlet; and
   (e) separating said nozzle from said container whereby a first part of said seal assembly remains with said nozzle and a second part is carried away with said container.

9. The method of claim 8 including the further steps of: bringing said nozzle into sealing engagement with another container; forcing said first part of said seal assembly from said nozzle into said container until it drops by gravity into said container; and repeating said steps (b) through (e).

10. The method of claim 8 including the steps of collecting a plurality of seal assemblies in a magazine for movement into said nozzle and container; and delivering additional seal assemblies to said magazine as they are consumed in sealing and unsealing said nozzle outlet.

References Cited

UNITED STATES PATENTS

| | | | |
|---|---|---|---|
| 542,364 | 7/1895 | Kopp | 137—614.17 |
| 693,133 | 2/1902 | Hennebohle | 251—211 |
| 744,048 | 11/1903 | Cerruti | 53—21(FC) |
| 1,462,113 | 7/1923 | Kuhner | 220—29 |
| 1,615,906 | 2/1927 | Kuhner | 220—29 |
| 2,244,082 | 6/1941 | Reyniers | 220—29X |
| 2,959,192 | 11/1960 | Bundus | 251—211X |
| 3,308,599 | 3/1967 | Perlowski | 53—37X |
| 3,352,756 | 11/1967 | Lockett | 220—29X |

WAYNE A. MORSE, JR., Primary Examiner

U.S. Cl. X.R.

53—21, 111, 264; 137—614.17; 220—29; 251—211